United States Patent
Maher et al.

(10) Patent No.: US 10,455,348 B2
(45) Date of Patent: Oct. 22, 2019

(54) AUTOMATIC CORRECTION OF ROOM ACOUSTICS BASED ON OCCUPANCY

(71) Applicant: DTS, Inc., Calabasas, CA (US)

(72) Inventors: Fred Maher, Los Angeles, CA (US); Theo Mack, Thousand Oaks, CA (US)

(73) Assignee: DTS, Inc., Calabasas, CA (US)

( * ) Notice: Subject to any disclaimer, the term of this patent is extended or adjusted under 35 U.S.C. 154(b) by 0 days.

(21) Appl. No.: 16/220,054

(22) Filed: Dec. 14, 2018

(65) Prior Publication Data
US 2019/0191262 A1 Jun. 20, 2019

Related U.S. Application Data

(60) Provisional application No. 62/599,244, filed on Dec. 15, 2017.

(51) Int. Cl.
*H04R 29/00* (2006.01)
*H04S 7/00* (2006.01)
*G06K 9/00* (2006.01)
*G01J 5/00* (2006.01)

(52) U.S. Cl.
CPC ............ *H04S 7/303* (2013.01); *G01J 5/0025* (2013.01); *G06K 9/00778* (2013.01); *H04S 7/301* (2013.01); *H04S 7/305* (2013.01); *G01J 2005/0077* (2013.01)

(58) Field of Classification Search
CPC ..................................................... H04R 29/00
See application file for complete search history.

(56) References Cited

U.S. PATENT DOCUMENTS

| | | |
|---|---|---|
| 2009/0030643 A1 | 1/2009 | White et al. |
| 2012/0242492 A1 | 9/2012 | Grunfeld |
| 2013/0232514 A1 | 9/2013 | Luff |
| 2014/0344017 A1 | 11/2014 | Deephanphongs et al. |
| 2016/0157612 A1 | 6/2016 | Lim et al. |
| 2016/0353224 A1 | 12/2016 | Reilly et al. |

FOREIGN PATENT DOCUMENTS

| | | |
|---|---|---|
| WO | 2019118814 | 6/2019 |

OTHER PUBLICATIONS

"International Application Serial No. PCT/US2018/065622, International Search Report dated Feb. 26, 2019", 2 pgs.
"International Application Serial No. PCT/US2018/065622, Written Opinion dated Feb. 26, 2019", 8 pgs.

*Primary Examiner* — Olisa Anwah
(74) *Attorney, Agent, or Firm* — Schwegman Lundberg & Woessner, P.A.

(57) ABSTRACT

An audio control system can automatically determine an occupancy of an audience seating area, and can automatically adjust a spectral content of an audio signal to at least partially compensate for spectral effects caused by the occupancy in the audience seating area. Such an audio control system can ensure that the sound in a particular room remains constant, or nearly constant, from performance to performance. The occupancy can include a number of people in attendance in the audience seating area, and/or locations of attendees in the audience seating area. The audio control system can automatically adjust the spectral content a single time, at the start of a performance, or can optionally automatically dynamically update the adjustment throughout the performance based on subsequent measurements of the occupancy. The system can determine the occupancy through ticket sales, and/or analysis of imaging of the seats in the audience seating area.

17 Claims, 2 Drawing Sheets

AUTOMATIC CORRECTION OF ROOM ACOUSTICS BASED ON OCCUPANCY

CROSS-REFERENCE TO RELATED APPLICATION

This application claims the benefit of U.S. Provisional Application No. 62/599,244, filed Dec. 15, 2017, which is hereby incorporated by reference in its entirety.

FIELD OF THE DISCLOSURE

The present disclosure relates to audio systems and methods.

BACKGROUND OF THE DISCLOSURE

Auditoriums with sound systems (such as cinemas and theaters) greatly vary in size and seating capacity. Once the structure is built it is often safe to assume that the acoustics of the venue due to the physical structure and furniture contained therein will change little over time. However, one challenge is that the acoustical characteristics of a given room (such as an auditoriums, cinema, or theater) will change according to the number of people seated in the room watching a presentation.

The immediate result of failing to take into consideration of how the number of people within a given room changes the acoustical characteristics of the room is inconsistent sound quality. By way of example, if a movie theater is acoustically "tuned" once with the theater filled to capacity then it will typically sound best when all seats are filled. If the theater is only half full it will not sound as good, and if the theater is less than one-third full it will sound even worse. Conversely, if the theater is tuned once while empty then it will sound best when every seat is empty and not as good when filled to capacity.

BRIEF DESCRIPTION OF THE DRAWINGS

Corresponding reference characters indicate corresponding parts throughout the several views. Elements in the drawings are not necessarily drawn to scale. The configurations shown in the drawings are merely examples, and should not be construed as limiting the scope of the invention in any manner.

DETAILED DESCRIPTION

The spectral effects of occupancy in an audience seating area are generally well-known in the field of professional audio. In general, the audience tends to absorb sound. As a result, a particular room will have less reflected sound when it is occupied than when it is empty. This effect can be more pronounced for high-frequency sound, so that an empty room can appear to have a boosted treble response, compared to the same room when it is occupied. For these reasons, a professional audio system for a particular room can have a first tuning (or equalization setting), for when the room is full, and a second tuning (or equalization setting), for when the room is empty. Typically, a sound engineer will manually select the first tuning or the second tuning at the beginning of a performance. At present, such a selection is not automated, and is not updated over the course of the performance. As a result, if people leave the room over the course of the performance, the sound quality can deteriorate toward the end of the performance. For example, the sound toward the end of the performance can appear shrill or glaring. The sound deterioration can make dialogue of the performance difficult to hear or understand.

To address these problems, the audio control system discussed in detail below can automatically determine an occupancy of an audience seating area, and can automatically adjust a spectral content (e.g., equalization) of an audio signal to at least partially compensate for spectral effects caused by the occupancy in the audience seating area. Such an audio control system can ensure that the sound in a particular room remains constant, or nearly constant, from performance to performance. The occupancy can include one or both of a number of people in attendance in the audience seating area, and locations of attendees in the audience seating area. The audio control system can automatically adjust the spectral content a single time, at the start of a performance, or can optionally automatically and dynamically update the adjustment throughout the performance based on subsequent measurements of the occupancy. The system can determine the occupancy through one or both of ticket sales for the performance, and analysis of imaging of the seats in the audience seating area.

Figure 1:
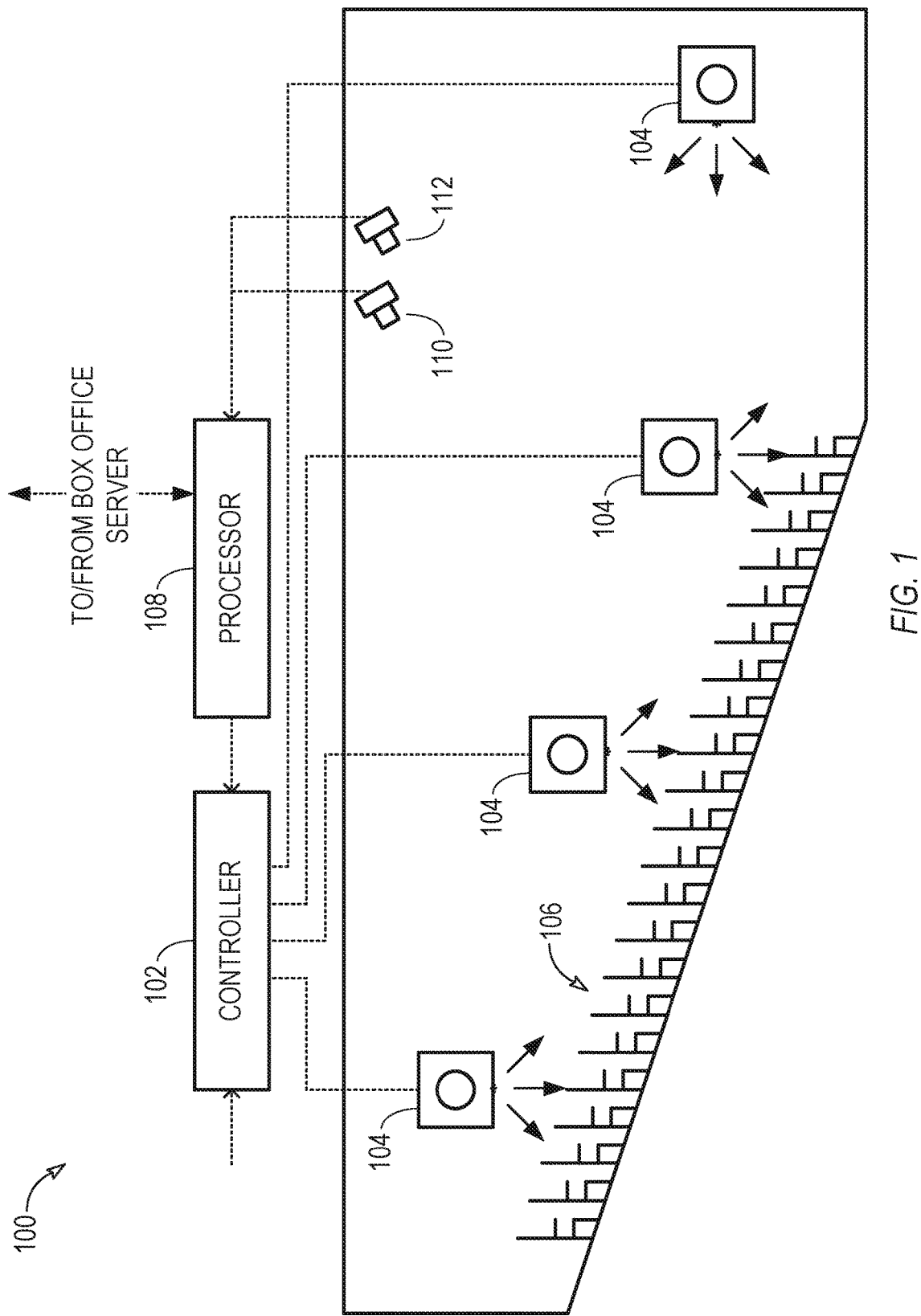
FIG. 1 shows a schematic drawing of an example of an audio control system, in accordance with some embodiments.

FIG. 1 shows a schematic drawing of an example of an audio control system 100, in accordance with some embodiments. The audio control system 100 of FIG. 1 is but one example of an audio control system 100; other suitable audio control systems can also be used.

A controller 102 can produce one or more audio signals. The controller 102 can receive input from a source, such as a film soundtrack, a mixing board, a satellite receiver, a digital file stored locally or accessed through a server, a streamed digital file, or other sources. The controller 102 can process the input, such as by one or more of spectrally adjusting the sound (e.g., applying equalization, or "EQ"), applying dynamic range compression/limiting, converting the input from a first format (e.g., two-channel stereo or 5.1-channel surround sound) to a second format (e.g., 11.1-channel surround sound), and other processing. The controller 102 can direct the processed input as one or more analog or digital audio signals to one or more speakers.

One or more speakers 104 can receive respective audio signals, produce sound corresponding to the audio signals, and direct the produced sound to an audience seating area 106. In some examples, the speakers 104 can be positioned around a perimeter of the audience seating area 106. In some examples, the speakers 104 can all be positioned at roughly an ear-level height with respect to audience members seated in the audience seating area 106. In some examples, one or more speakers 104 can be positioned above or below the audience seating area 106. Typically, the speakers 104 are rigidly fastened in place with respect to the audience seating area 106, as commonly occurs in auditoriums and theaters. In other examples, the speakers 104 can be movably located at various locations within and around the audience seating area 106.

A processor 108 can be coupled to the controller 102. In some examples, the processor 108 can be included in the controller 102. For example, the processor 108 can perform the same computational tasks as the controller 102, and can optionally be included in the same housing or enclosure as the controller 102. In other examples, the processor 108 can be separate from the controller 102. For example, the processor 108 can the controller 102 can perform different computational tasks, and can either be included in the same housing or in separate housings.

The processor 108 can execute computing instructions to perform data processing activities. The data processing activities can include automatically determining an occupancy of the audience seating area 106. The data processing activities can further include, based on the determined occupancy, automatically adjusting a spectral content (e.g., performing spectral equalization, or "EQ") of the audio signal to at least partially compensate for spectral effects caused by the occupancy in the audience seating area 106.

In some examples, the occupancy can be determined once at a specified time during a specified time duration, such as at or near the beginning of a performance. In some of these examples, the spectral content can be adjusted at the specified time, such as at or near the beginning of the performance, and adjusted again after the occupancy has been determined.

In other examples, the occupancy can be determined repeatedly throughout a performance. For example, the occupancy can be determined at regular intervals, such as every fifteen minutes or other suitable time frame, or with irregular spacing. In some of these examples, the spectral content can be adjusted recurrently throughout the performance in response to the determined occupancy to at least partially compensate for the spectral effects caused by the determined occupancy in the audience seating area 106.

The data processing activities can include automatically determining an occupancy of the audience seating area 106. In some examples, the occupancy can include a number of people seated in the audience seating area 106. In some examples, the occupancy can include locations of occupied seats in the audience seating area 106. In some examples, the occupancy can include a number of people seated in the audience seating area 106 and locations of occupied seats in the audience seating area 106.

Several techniques are contemplated for automatically determining the occupancy of the audience seating area 106.

A first technique involves analyzing video surveillance of the seats in the audience seating area 106. In some examples, the audio control system 100 can further include at least one seating area camera 110 that can capture at least one video image of the audience seating area 106. In some examples, the data processing activities can further include performing facial recognition on the at least one captured video image to determine the occupancy of the audience seating area 106. For example, the processor 108 can analyze specific locations in the captured video image where audience members' faces are expected to be, and can determine if a face is present in the video image or absent from the video image at each specific location. In some examples, the processor 108 can perform the facial recognition repeatedly over a duration of a performance, and can adjust the spectral content of the audio signal repeatedly over the duration of the performance. In other examples, the facial recognition can be performed once at the beginning of a performance.

A second technique involves thermal imaging of the seats in the audience seating area 106. In some examples, the audio control system 100 can further include at least one thermal imager 112 that can determine whether, for each seat of the audience seating area 106, a person is seated in the seat. In some examples, the data processing activities can further include automatically determining, from the at least one thermal imager 112, the occupancy of the audience seating area 106. For example, the thermal imager 112 can determine whether the heat signature of a human is present or absent, for each seat in the audience seating area 106. In some examples, the thermal imager 112 can determine the occupancy repeatedly over the duration of a performance, and the spectral content of the audio signal can be adjusted repeatedly over the duration of the performance. In other examples, the thermal imager 112 can determine the occupancy once at the beginning of a performance.

A third technique involves checking ticket sales to determine the occupancy. In some examples, the audio control system 100 can automatically determine a number of tickets sold for a show, the number of tickets sold for the show corresponding to a number of people seated in the audience seating area 106. In some examples, the processor 108 can access a box office server, and retrieve from the box office server data corresponding to the number of tickets sold for the show. In some examples, the box office server can be accessed once per performance, such as before or near the beginning of the performance, and the spectral content of the audio signal can be adjusted once at or near the beginning of the performance. In other examples, the occupancy can be updated automatically throughout the performance. For examples, the number of people seated in the audience seating area 106 can be updated by automatically counting people that enter and exit the audience seating area 106 over the duration of a show. To perform this counting, the audio control system 100 can further include at least one entrance/exit area camera that can capture at least one video image of at least one entrance/exit area of the audience seating area 106. The processor 108 can automatically count, from the at least one video image, people that enter or exit the audience seating area 106 through the entrance/exit area, and can automatically update the number of people seated in the audience seating area 106 with the counted people. In some examples, the box office server can additionally provide data corresponding to locations of seats in the audience seating area 106 for which tickets for the show have been sold.

Other techniques can also be used, including reading values from pressure or force sensors placed under each seat. Any or all of these techniques may optionally be used in combination with one another to determine the occupancy of the audience seating area 106.

In some examples, the audio control system 100 can adjust the spectral content in a similar manner for each speaker 104. For example, output of a a particular frequency, such as 2 kHz, can be boosted by particular amount, such as 1 dB, for all speakers 104. This is but one numerical example; other values can also be used.

In other examples, the audio control system 100 can adjust the spectral content differently for at least two of the speakers 104, based on locations of the speakers 104 with respect to the audience seating area 106, and based on the determined occupancy of the audience seating area 106. In other words, the audio control system 100 can tailor the spectral adjustments of speakers 104 to correspond to audience occupancy near the speakers 104. For example, if the audience is clustered near the front of a theater for a particular performance, so that the front of the theater has mostly full seats while the back of the theater has mostly empty seats, the audio control system 100 can spectrally adjust the audio for speakers 104 at the front of the theater differently than it does for speakers 104 at the back of the theater.

As an additional option, the audio control system 100 can optionally control a volume level based on occupancy. For example, if a portion of a theater is found to be unoccupied, such as a balcony, the audio control system 100 can reduce the volume of speakers 104 near the unoccupied portion, and optionally boost the volume of speakers 104 away from the unoccupied portion to achieve a desired volume level away from the unoccupied portion. In this manner, the audio control system 100 can reduce or eliminate the undesirable effects of sound reflections from the unoccupied seats.

Figure 2:
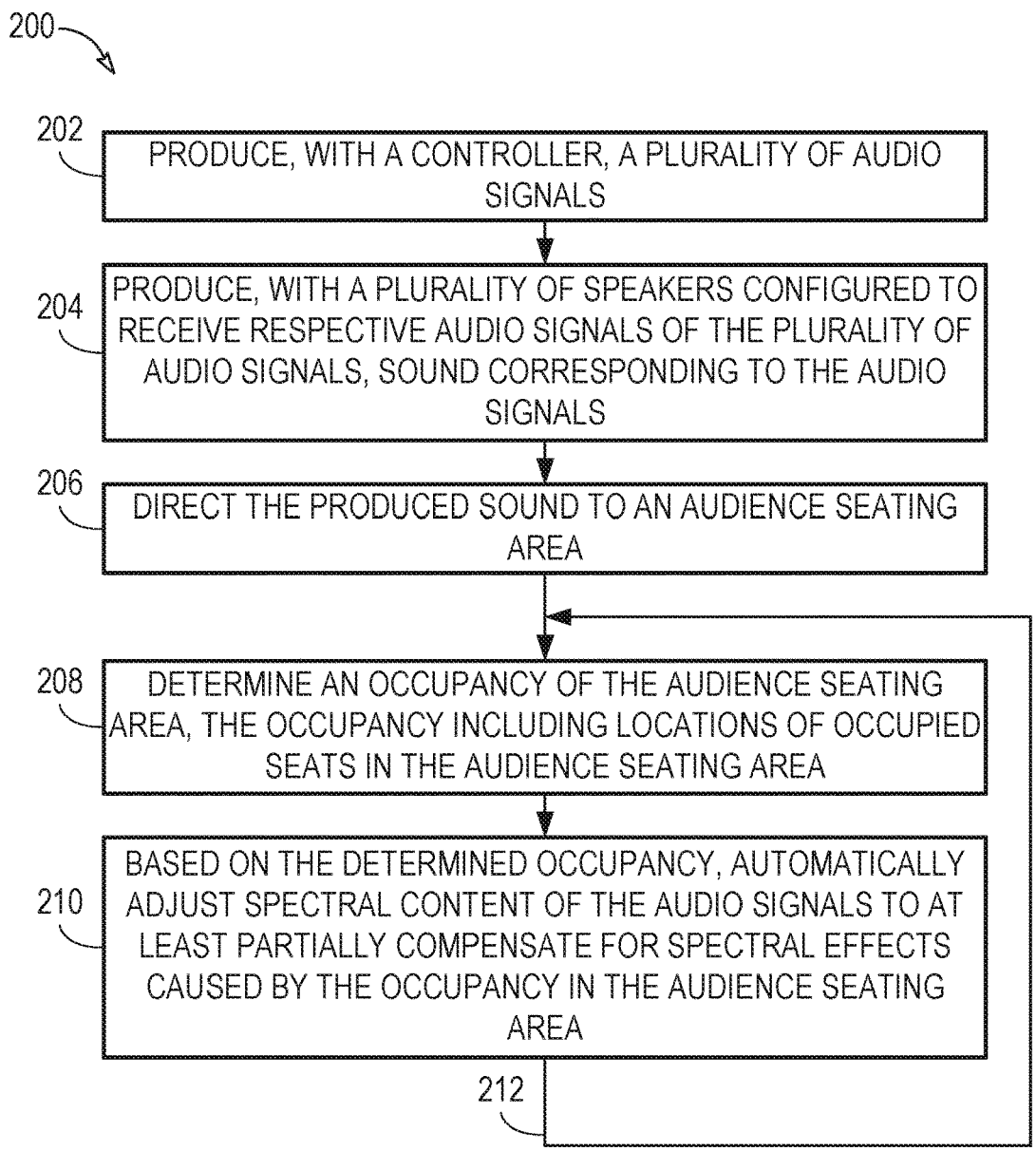
FIG. 2 shows a flowchart of an example of a method for controlling an audio control system, in accordance with some embodiments.

FIG. 2 shows a flowchart of an example of a method 200 for controlling an audio control system, in accordance with some embodiments. The method 200 can be executed on the system of FIG. 1, or on any suitable audio control system. The method of FIG. 2 is but one method for controlling an audio control system; other suitable methods can also be used.

At operation 202, a controller can produce a plurality of audio signals.

At operation 204, a plurality of speakers can receive respective audio signals of the plurality of audio signals, and can produce sound corresponding to the audio signals.

At operation 206, the plurality of speakers can direct the produced sound to an audience seating area.

At operation 208, a processor coupled to the controller can determine an occupancy of the audience seating area, the occupancy including locations of occupied seats in the audience seating area.

At operation 210, the processor can, based on the determined occupancy, automatically adjust spectral content of the audio signals to at least partially compensate for spectral effects caused by the occupancy in the audience seating area.

At operation 212, operations 208 and 210 can optionally be repeated over a duration of a performance.

In some examples, the spectral content can be adjusted differently for at least two of the plurality of speakers, based on locations of the speakers with respect to the audience seating area, and based on the determined occupancy of the audience seating area.

Many other variations than those described herein will be apparent from this document. For example, depending on the embodiment, certain acts, events, or functions of any of the methods and algorithms described herein can be performed in a different sequence, can be added, merged, or left out altogether (such that not all described acts or events are necessary for the practice of the methods and algorithms). Moreover, in certain embodiments, acts or events can be performed concurrently, such as through multi-threaded processing, interrupt processing, or multiple processors or processor cores or on other parallel architectures, rather than sequentially. In addition, different tasks or processes can be performed by different machines and computing systems that can function together.

The various illustrative logical blocks, modules, methods, and algorithm processes and sequences described in connection with the embodiments disclosed herein can be implemented as electronic hardware, computer software, or combinations of both. To clearly illustrate this interchangeability of hardware and software, various illustrative components, blocks, modules, and process actions have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of this document.

The various illustrative logical blocks and modules described in connection with the embodiments disclosed herein can be implemented or performed by a machine, such as a general purpose processor, a processing device, a computing device having one or more processing devices, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor and processing device can be a microprocessor, but in the alternative, the processor can be a controller, microcontroller, or state machine, combinations of the same, or the like. A processor can also be implemented as a combination of computing devices, such as a combination of a DSP and a microprocessor, a plurality of microprocessors, one or more microprocessors in conjunction with a DSP core, or any other such configuration.

Embodiments of the automatic room acoustics correction system and method described herein are operational within numerous types of general purpose or special purpose computing system environments or configurations. In general, a computing environment can include any type of computer system, including, but not limited to, a computer system based on one or more microprocessors, a mainframe computer, a digital signal processor, a portable computing device, a personal organizer, a device controller, a computational engine within an appliance, a mobile phone, a desktop computer, a mobile computer, a tablet computer, a smartphone, and appliances with an embedded computer, to name a few.

Such computing devices can be typically be found in devices having at least some minimum computational capability, including, but not limited to, personal computers, server computers, hand-held computing devices, laptop or mobile computers, communications devices such as cell phones and PDA's multiprocessor systems, microprocessor-based systems, set top boxes, programmable consumer electronics, network PCs, minicomputers, mainframe computers, audio or video media players, and so forth. In some embodiments the computing devices will include one or more processors. Each processor may be a specialized microprocessor, such as a digital signal processor (DSP), a very long instruction word (VLIW), or other micro-controller, or can be conventional central processing units (CPUs) having one or more processing cores, including specialized graphics processing unit (GPU)-based cores in a multi-core CPU.

The process actions or operations of a method, process, or algorithm described in connection with the embodiments of the automatic room acoustics correction system and method disclosed herein can be embodied directly in hardware, in a software module executed by a processor, or in any combination of the two. The software module can be contained in computer-readable media that can be accessed by a computing device. The computer-readable media includes both volatile and nonvolatile media that is either removable, non-removable, or some combination thereof. The computer-readable media is used to store information such as computer-readable or computer-executable instructions, data structures, program modules, or other data. By way of example, and not limitation, computer readable media may comprise computer storage media and communication media.

Computer storage media includes, but is not limited to, computer or machine readable media or storage devices such as Bluray discs (BD), digital versatile discs (DVDs), compact discs (CDs), floppy disks, tape drives, hard drives, optical drives, solid state memory devices, RAM memory, ROM memory, EPROM memory, EEPROM memory, flash memory or other memory technology, magnetic cassettes, magnetic tapes, magnetic disk storage, or other magnetic storage devices, or any other device which can be used to store the desired information and which can be accessed by one or more computing devices.

A software module can reside in the RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an application specific integrated circuit (ASIC). The ASIC can reside in a user terminal. Alternatively, the processor and the storage medium can reside as discrete components in a user terminal.

The phrase "non-transitory" as used in this document means "enduring or long-lived". The phrase "non-transitory computer-readable media" includes any and all computer-readable media, with the sole exception of a transitory, propagating signal. This includes, by way of example and not limitation, non-transitory computer-readable media such as register memory, processor cache and random-access memory (RAM).

The phrase "audio signal" is a signal that is representative of a physical sound.

Retention of information such as computer-readable or computer-executable instructions, data structures, program modules, and so forth, can also be accomplished by using a variety of the communication media to encode one or more modulated data signals, electromagnetic waves (such as carrier waves), or other transport mechanisms or communications protocols, and includes any wired or wireless information delivery mechanism. In general, these communication media refer to a signal that has one or more of its characteristics set or changed in such a manner as to encode information or instructions in the signal. For example, communication media includes wired media such as a wired network or direct-wired connection carrying one or more modulated data signals, and wireless media such as acoustic, radio frequency (RF), infrared, laser, and other wireless media for transmitting, receiving, or both, one or more modulated data signals or electromagnetic waves. Combinations of the any of the above should also be included within the scope of communication media.

Further, one or any combination of software, programs, computer program products that embody some or all of the various embodiments of the automatic room acoustics correction system and method described herein, or portions thereof, may be stored, received, transmitted, or read from any desired combination of computer or machine readable media or storage devices and communication media in the form of computer executable instructions or other data structures.

Embodiments of the automatic room acoustics correction system and method described herein may be further described in the general context of computer-executable instructions, such as program modules, being executed by a computing device. Generally, program modules include routines, programs, objects, components, data structures, and so forth, which perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the faun and details of the devices or algorithms illustrated can be made without departing from the scope of the disclosure. As will be recognized, certain embodiments of the automatic room acoustics correction system and method described herein can be embodied within a form that does not provide all of the features and benefits set forth herein, as some features can be used or practiced separately from others.

EXAMPLES

To further illustrate the device and related method disclosed herein, a non-limiting list of examples is provided below. Each of the following non-limiting examples can stand on its own, or can be combined in any permutation or combination with any one or more of the other examples.

In Example 1, an audio control system can include: a controller configured to produce an audio signal that, when received by a speaker, causes the speaker to produce sound and direct the produced sound to an audience seating area; and a processor coupled to the controller, the processor configured to execute computing instructions to perform data processing activities, the data processing activities comprising: automatically determining an occupancy of the audience seating area; and based on the determined occupancy, automatically adjusting a spectral content of the audio signal to at least partially compensate for spectral effects caused by the occupancy in the audience seating area.

In Example 2, the audio control system of Example 1 can optionally be configured such that the data processing activities include: determining the occupancy once at a specified time during a specified time duration; and adjusting the spectral content at the specified time.

In Example 3, the audio control system of any one of Examples 1-2 can optionally be configured such that the data processing activities include: determining the occupancy repeatedly throughout a performance; and adjusting the spectral content recurrently throughout the performance in response to the determined occupancy to at least partially compensate for the spectral effects caused by the determined occupancy in the audience seating area.

In Example 4, the audio control system of any one of Examples 1-3 can optionally be configured such that the data processing activities include determining the occupancy of the audience seating area according to a number of people seated in the audience seating area.

In Example 5, the audio control system of any one of Examples 1-4 can optionally be configured such that the data processing activities include determining the occupancy of the audience seating area according to locations of occupied seats in the audience seating area.

In Example 6, the audio control system of any one of Examples 1-5 can optionally be configured such that the data processing activities include determining the occupancy of the audience seating area according to a number of people seated in the audience seating area and locations of seats in the audience seating area in which the number of people are seated.

In Example 7, the audio control system of any one of Examples 1-6 can optionally further include at least one seating area camera configured to capture at least one video image of the audience seating area; wherein the data processing activities further comprise performing facial recognition on the at least one captured video image to determine the occupancy of the audience seating area.

In Example 8, the audio control system of any one of Examples 1-7 can optionally be configured such that the facial recognition is performed repeatedly over a duration of a performance, and the spectral content of the audio signal is adjusted repeatedly over the duration of the performance.

In Example 9, the audio control system of any one of Examples 1-8 can optionally further include at least one thermal imager configured to determine whether, for each seat of the audience seating area, a person is seated in the seat; wherein the data processing activities further comprise automatically determining, from the at least one thermal imager, the occupancy of the audience seating area.

In Example 10, the audio control system of any one of Examples 1-9 can optionally be configured such that the thermal imager is configured to perform the determining repeatedly over the duration of a performance, and the spectral content of the audio signal is adjusted repeatedly over the duration of the performance.

In Example 11, the audio control system of any one of Examples 1-10 can optionally be configured such that automatically determining the occupancy of the audience seating area comprises: automatically determining a number of tickets sold for a show, the number of tickets sold for the show corresponding to a number of people seated in the audience seating area.

In Example 12, the audio control system of any one of Examples 1-11 can optionally be configured such that automatically determining the number of tickets sold for the show comprises: with the processor, accessing a box office server; retrieving, from the box office server, data corresponding to the number of tickets sold for the show.

In Example 13, the audio control system of any one of Examples 1-12 can optionally be configured such that automatically determining the occupancy of the audience seating area further comprises: automatically updating the number of people seated in the audience seating area by automatically counting people that enter and exit the audience seating area over the duration of a show.

In Example 14, the audio control system of any one of Examples 1-13 can optionally further include at least one entrance/exit area camera configured to capture at least one video image of at least one entrance/exit area of the audience seating area; wherein the data processing activities further comprise: automatically counting, from the at least one video image, people that enter or exit the audience seating area through the entrance/exit area; and automatically updating the number of people seated in the audience seating area with the counted people.

In Example 15, the audio control system of any one of Examples 1-14 can optionally be configured such that automatically determining the occupancy of the audience seating area comprises: with the processor, accessing a box office server; retrieving, from the box office server, data corresponding to locations of seats in the audience seating area for which tickets for the show have been sold.

In Example 16, the audio control system of any one of Examples 1-15 can optionally further include a speaker configured to receive the audio signal produce sound corresponding to the audio signal, and direct the produced sound to the audience seating area.

In Example 17, an audio control system can include: a controller configured to produce a plurality of audio signals; a plurality of speakers configured to receive respective audio signals of the plurality of audio signals, produce sound corresponding to the audio signals, and direct the produced sound to an audience seating area; and a processor coupled to the controller, the processor configured to execute computing instructions to perform data processing activities, the data processing activities comprising: automatically determining an occupancy of the audience seating area, the occupancy including locations of occupied seats in the audience seating area; and based on the determined occupancy, automatically adjusting spectral content of the audio signals to at least partially compensate for spectral effects caused by the occupancy in the audience seating area.

In Example 18, the audio control system of Example 17 can optionally be configured such that the data processing activities include adjusting the spectral content differently for at least two of the plurality of speakers, based on locations of the speakers with respect to the audience seating area, and based on the determined occupancy of the audience seating area.

In Example 19, a method for controlling an audio control system can include: producing, with a controller, a plurality of audio signals; producing, with a plurality of speakers configured to receive respective audio signals of the plurality of audio signals, sound corresponding to the audio signals; directing the produced sound to an audience seating area; and with a processor coupled to the controller, repeatedly, over a duration of a performance: determining an occupancy of the audience seating area, the occupancy including locations of occupied seats in the audience seating area; and based on the determined occupancy, automatically adjusting spectral content of the audio signals to at least partially compensate for spectral effects caused by the occupancy in the audience seating area.

In Example 20, the method of Example 19 can optionally be configured such that the spectral content is adjusted differently for at least two of the plurality of speakers, based on locations of the speakers with respect to the audience seating area, and based on the determined occupancy of the audience seating area.

What is claimed is:

1. An audio control system, comprising:
   a controller configured to produce an audio signal that, when received by a speaker, causes the speaker to produce sound and direct the produced sound to an audience seating area; and
   a processor coupled to the controller, the processor configured to execute computing instructions to perform data processing activities, the data processing activities comprising:
      automatically determining an occupancy of the audience seating area by:
         with the processor, accessing a box office server;
         retrieving, from the box office server, data corresponding to a number of tickets sold for the show, the number of tickets sold for the show corresponding to a number of people seated in the audience seating area; and
         automatically updating the number of people seated in the audience seating area by automatically counting people that enter and exit the audience seating area over the duration of a show; and
      based on the determined occupancy, automatically adjusting a spectral content of the audio signal to at least partially compensate for spectral effects caused by the occupancy in the audience seating area.

2. The audio control system of claim 1, wherein the data processing activities include:
   adjusting the spectral content at a specified time.

3. The audio control system of claim 1, wherein the data processing activities include:
   adjusting the spectral content recurrently throughout a performance in response to the determined occupancy to at least partially compensate for the spectral effects caused by the determined occupancy in the audience seating area.

4. The audio control system of claim 1, wherein the data processing activities include determining the occupancy of the audience seating area according to a number of people seated in the audience seating area.

5. The audio control system of claim 1, wherein the data processing activities include determining the occupancy of the audience seating area according to locations of occupied seats in the audience seating area.

6. The audio control system of claim 1, wherein the data processing activities include determining the occupancy of the audience seating area according to a number of people seated in the audience seating area and locations of seats in the audience seating area in which the number of people are seated.

7. The audio control system of claim 1,
   further comprising at least one seating area camera configured to capture at least one video image of the audience seating area;
   wherein the data processing activities further comprise performing facial recognition on the at least one captured video image to determine the occupancy of the audience seating area.

8. The audio control system of claim 7, wherein the facial recognition is performed repeatedly over a duration of a performance, and the spectral content of the audio signal is adjusted repeatedly over the duration of the performance.

9. The audio control system of claim 1,
   further comprising at least one thermal imager configured to determine whether, for each seat of the audience seating area, a person is seated in the seat;
   wherein the data processing activities further comprise automatically determining, from the at least one thermal imager, the occupancy of the audience seating area.

10. The audio control system of claim 9, wherein the thermal imager is configured to perform the determining repeatedly over the duration of a performance, and the spectral content of the audio signal is adjusted repeatedly over the duration of the performance.

11. The audio control system of claim 1,
    further comprising at least one entrance/exit area camera configured to capture at least one video image of at least one entrance/exit area of the audience seating area;
    wherein the data processing activities further comprise:
       automatically counting, from the at least one video image, people that enter or exit the audience seating area through the entrance/exit area; and
       automatically updating the number of people seated in the audience seating area with the counted people.

12. The audio control system of claim 1, wherein automatically determining the occupancy of the audience seating area comprises:
    retrieving, from the box office server, data corresponding to locations of seats in the audience seating area for which tickets for the show have been sold.

13. The audio control system of claim 1, further comprising a speaker configured to receive the audio signal, produce sound corresponding to the audio signal, and direct the produced sound to the audience seating area.

14. An audio control system, comprising:
    a controller configured to produce a plurality of audio signals;
    a plurality of speakers configured to receive respective audio signals of the plurality of audio signals, produce sound corresponding to the audio signals, and direct the produced sound to an audience seating area; and
    a processor coupled to the controller, the processor configured to execute computing instructions to perform data processing activities, the data processing activities comprising:
       automatically determining an occupancy of the audience seating area, the occupancy including locations of occupied seats in the audience seating area by:
          with the processor, accessing a box office server;
          retrieving, from the box office server, data corresponding to a number of tickets sold for the show, the number of tickets sold for the show corresponding to a number of people seated in the audience seating area; and
          automatically updating the number of people seated in the audience seating area by automatically counting people that enter and exit the audience seating area over the duration of a show; and
       based on the determined occupancy, automatically adjusting spectral content of the audio signals to at least partially compensate for spectral effects caused by the occupancy in the audience seating area.

15. The audio control system of claim 14, wherein the data processing activities include adjusting the spectral content differently for at least two of the plurality of speakers, based on locations of the speakers with respect to the audience seating area, and based on the determined occupancy of the audience seating area.

16. A method for controlling an audio control system, the method comprising:
- producing, with a controller, a plurality of audio signals;
- producing, with a plurality of speakers configured to receive respective audio signals of the plurality of audio signals, sound corresponding to the audio signals;
- directing the produced sound to an audience seating area; and
- with a processor coupled to the controller, repeatedly, over a duration of a performance:
  - determining an occupancy of the audience seating area, the occupancy including locations of occupied seats in the audience seating area, by:
    - with the processor, accessing a box office server;
    - retrieving, from the box office server, data corresponding to a number of tickets sold for the show, the number of tickets sold for the show corresponding to a number of people seated in the audience seating area; and
    - automatically updating the number of people seated in the audience seating area by automatically counting people that enter and exit the audience seating area over the duration of a show; and
  - based on the determined occupancy, automatically adjusting spectral content of the audio signals to at least partially compensate for spectral effects caused by the occupancy in the audience seating area.

17. The method of claim 16, wherein the spectral content is adjusted differently for at least two of the plurality of speakers, based on locations of the speakers with respect to the audience seating area, and based on the determined occupancy of the audience seating area.

* * * * *